US006384624B1

(12) United States Patent
Yasuura et al.

(10) Patent No.: US 6,384,624 B1
(45) Date of Patent: *May 7, 2002

(54) LOGICAL OPERATIONAL CIRCUIT USING TWO STAGE NEUMOS CIRCUITS

(75) Inventors: Hiroto Yasuura, 1-1-308, Kashiihama 4-chome, Higashi-ku, Fukuoka-shi, Fukuoka-ken, 813; Kenjiro Ike, Fukuoka-ken, both of (JP)

(73) Assignee: Hiroto Yasuura (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,858

(22) Filed: Oct. 10, 1997

(30) Foreign Application Priority Data

Oct. 16, 1996 (JP) ............................................. 8-273864
Oct. 3, 1997 (JP) ............................................. 9-271679

(51) Int. Cl.[7] ............................................. H03K 19/23
(52) U.S. Cl. .............................. 326/35; 326/39; 326/45
(58) Field of Search .............................. 326/35, 36, 44, 326/45, 49, 50, 39, 41; 706/26, 33, 42

(56) References Cited

U.S. PATENT DOCUMENTS 5,021,693 A * 6/1991 Shima ........................ 326/36
5,444,411 A * 8/1995 Yang et al. .................... 326/36
5,539,329 A * 7/1996 Shibata et al. ................. 326/39
5,548,685 A * 8/1996 Wang ............................ 706/26
5,644,253 A * 7/1997 Takatsu ........................ 326/35
5,656,948 A * 8/1997 Sobelman et al. ............. 326/35
5,661,421 A * 8/1997 Ohmi et al. ................... 706/33
5,818,081 A * 10/1998 Ohmi et al. ................... 706/26

* cited by examiner

*Primary Examiner*—David Nelms
*Assistant Examiner*—Gene N. Auduong
(74) *Attorney, Agent, or Firm*—Randall J. Knuth

(57) ABSTRACT

The present invention has as an object thereof to provide a logical operational circuit which is capable of realizing, with present semiconductor manufacturing technology, logical functions, the realization of which has been extremely difficult heretofore as a result of constraints in the voltage levels which are to be discriminated on the floating gate of the neuMOS. The logical operational circuit comprises 3 or more neuMOS inverters having a CMOS structure having a floating gate (FG) and one or two or more input gates capacitively coupled with the floating gate, wherein the output of the third inverter is connected via a capacity with the floating gate of the second inverter, the output of the second inverter is connected via a capacity with the floating gate of the first inverter, a plurality of input signals are connected to at least one or more of the input gates of the neuMOS inverters within the circuit, predetermined logical operations are conducted with respect to the plurality of input signals, and the results thereof are made the output of the first neuMOS inverter.

11 Claims, 8 Drawing Sheets 2-stage neuMOS Circuit

Multi-stage neuMOS Circuit

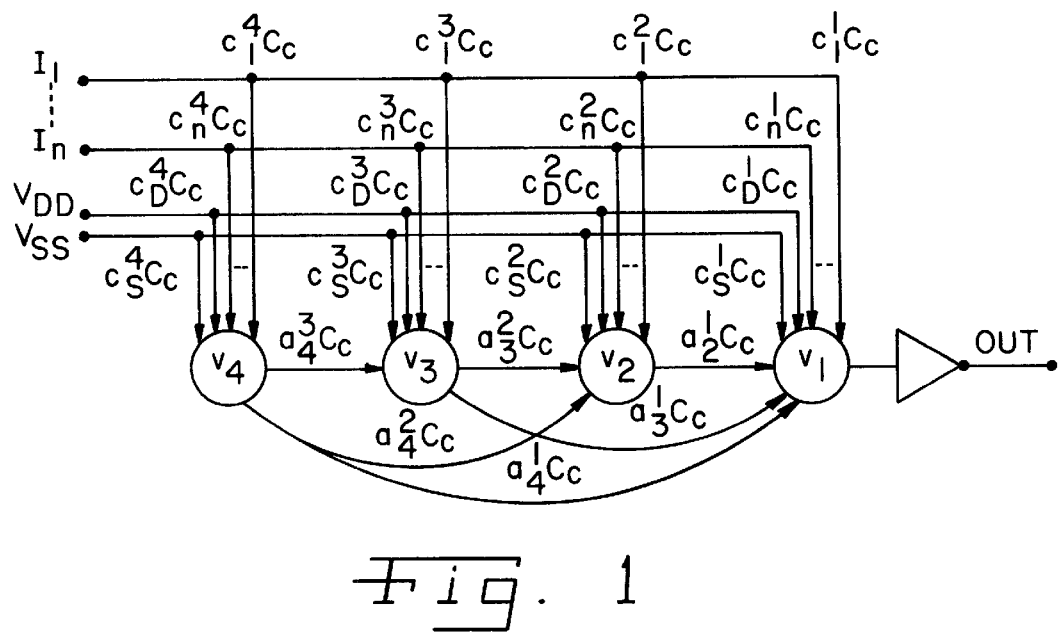
Fig. 1
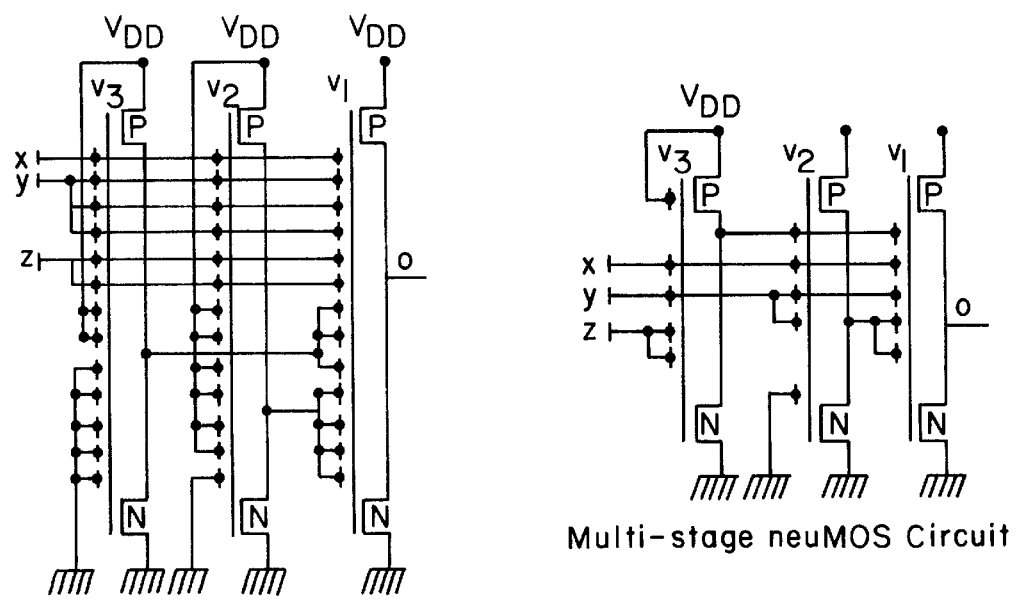
2-stage neuMOS Circuit
Fig. 2A
Multi-stage neuMOS Circuit
Fig. 2B

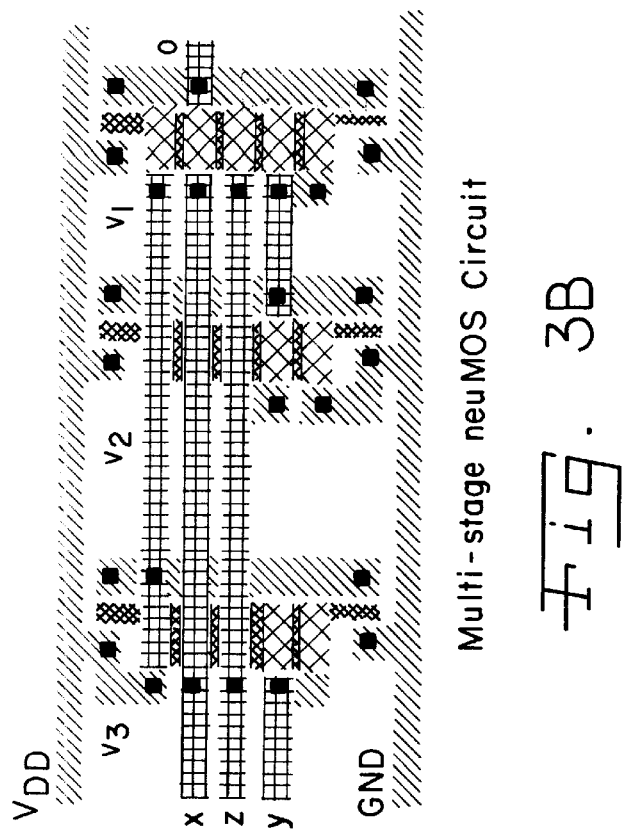
Fig. 3B Multi-stage neuMOS Circuit
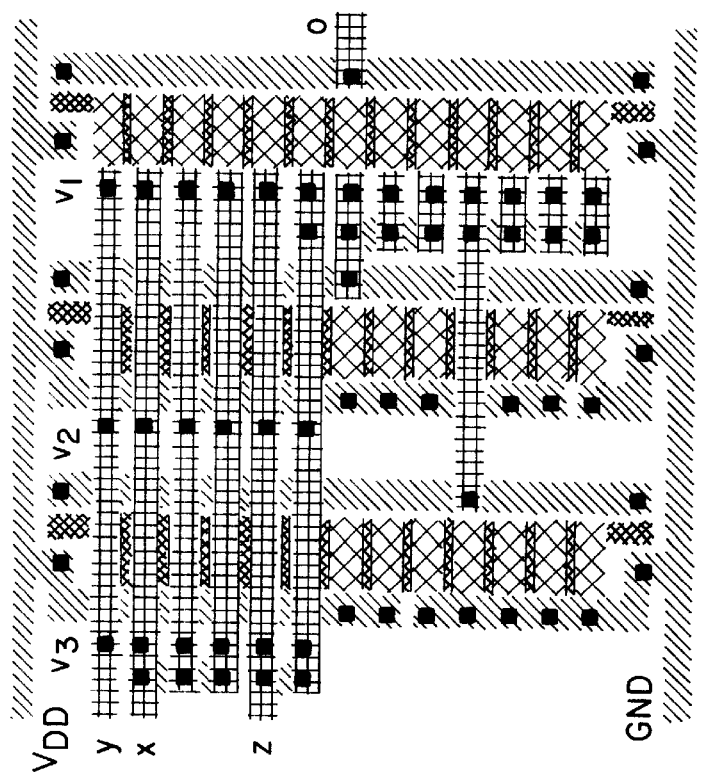
Fig. 3A 2-stage neuMOS Circuit 2-stage neuMOS Circuit Multi-stage neuMOS Circuit

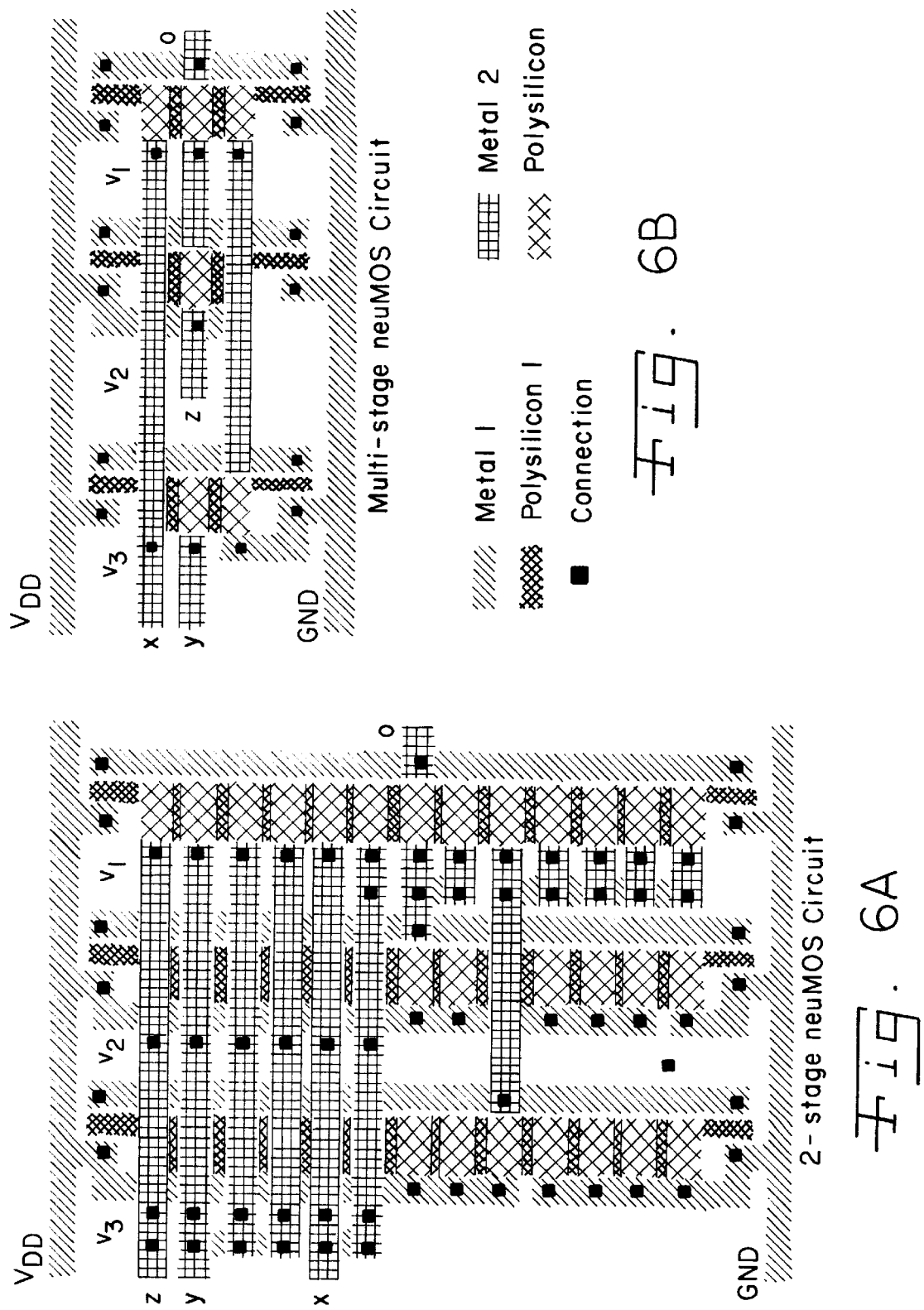

Circuit Diagram

LOGICAL OPERATIONAL CIRCUIT USING TWO STAGE NEUMOS CIRCUITS

BACKGROUND OF THE INVENTION

Description of Related Art

The neuron MOS transistor (hereinbelow shortened to neuMOS) is a multi-input MOS transistor having a plurality of input gates, which calculates the weighting addition of all input signals and controls the ON OFF state of the transistor; such transistors have been the subject of a considerable amount of research in recent years as devices having a variety of functions.

It is possible to think of the neuMOS as dealing with multivalued signals within the device; it is capable of globally realizing a binary logical circuit using multivalues locally. When a logical circuit is designed using neuMOS, it is possible to greatly reduce the number of transistors in comparison with CMOS.

In the neuMOS, the MOSFET gate is made floating, and the structure is such that a plurality of input gate electrodes are coupled via a capacity with the floating gate. When a neuMOS logical circuit is actually constructed, a neuMOS inverter format having a CMOS structure is employed. The structure of the neuMOS inverter, and a circuit diagram thereof, are shown in FIG. 8.

If the coupling capacity of one input gate of a neuMOS inverter is fixed at Cc, then when the circuit inputs are connected to a number a of input gates, then it is possible to view the coupling capacity of the circuit inputs as a $C_c$. Now, if the input voltage in the circuit input $I_i$ is represented by $V_i$, the coupling capacity of $I_i$ is represented by ciCc (where $c_i$ is an integer), and the parasitic capacity of the neuMOS inverter is represented by $C_0$, then the potential $\phi$ of the floating gate is represented by the following:

[Arithmetic Formula 1]

$$\phi = \frac{\sum_{i=1}^{n} c_i C_c V_i}{C_{TOT}} \quad (1)$$

$$C_{TOT} = C_0 + G \cdot C_c \quad (2)$$

$$G = \sum_{i=1}^{n} c_i$$

In the above formula, G represents the total number of input gates of the neuMOS inverter.

The output voltage of the neuMOS inverter changes based on the size relationship between the floating gate potential $\phi$ and the inversion threshold voltage Vth of the neuMOS inverter. The voltage $V_{OUT}$ of the output OUT of the neuMOS inverter can be expressed as the formula hereinbelow using formula (1).

[Arithmetic Formula 2]

$$V_{OUT} = \begin{cases} V_{DD} & \left(\frac{\sum_{i=1}^{n} c_i C_c V_i}{C_{TOT}} < V_{th}\right) \\ V_{SS} & \left(\frac{\sum_{i=1}^{n} c_i C_c V_i}{C_{TOT}} > V_{th}\right) \end{cases} \quad (3)$$

If Vth is set to $\gamma V_{DD}/2[V]$ ($\gamma = G \cdot C_c/C_{TOT}$), and a variable $V_i$ corresponding to 1 when $V_i$ is $V_{DD}[V]$, and to 0 when $V_i$ is $C_{SS}[V]$ is introduced, then it is possible to view the neuMOS inverter as an element which realizes the following threshold function from formula (3).

[Arithmetic Formula 3]

$$f(x) = \begin{cases} 1 & \left(\sum_{i=1}^{n} c_i x_i < \frac{G}{2}\right) \\ 0 & \left(\sum_{i=1}^{n} c_i x_i > \frac{G}{2}\right) \end{cases} \quad (4)$$

$$x = (x_1, \cdots, x_n)(i = 1, \cdots, n), x_i \in \{0, 1\}$$

Changing the way in which the neuMOS inverter is viewed, by causing the values $(mC_c/C_{TOT})$ $V_{DD}[V]$ (m=0, . . . , G) which may be taken by the floating gate potential $\phi$ to correspond to logical values m, the neuMOS-inverter may be thought of as dealing with multivalued signals in a voltage mode within the device. In this way, G represents the total number of input gates of the neuMOS inverter, and simultaneously represents the number of multivalued levels which may be handled within the device.

Since an increase in G is linked to an increase in the multivalued levels handled in the device, it becomes possible to realize a variety of logical functions using one element, and it is possible to design logical circuits having even fewer elements. However, on the other hand, since $C_{TOT}$ is proportional to G, from formula (2), the value of the size $C_c/C_{TOT}$) $V_{DD}$ of the change in potential which must be discriminated on the floating gate becomes even smaller. The minimum value of the change in potential which is to be discriminated on the floating gate is determined by the inversion threshold voltage $V_{th}$ of the inverter, the size of the variation in the coupling capacity of the inputs, and the like. That is to say, the upper limit of G is determined by the precision of the device manufacturing process. The upper limit of G has an effect on the reliability of the circuit operation, so that this serves as an extremely strong constraint on the design of the neuMOS circuit.

As described above, the neuMOS inverter can be regarded as a threshold element which realizes formula (4). However, since the threshold function can not express a freely selected logical function, in order to realize a freely selected logical function using neuMOS, it is necessary to adopt a circuit structure in which a plurality of neuMOS inverters are combined.

A neuMOS circuit fulfilling the conditions stated below can be considered as one neuMOS circuit structure which realizes freely selected logical functions.

1. The circuit comprises a number n of circuit inputs and a number N from $v_1$ to $v_N$ of neuMOS inverters, and the value of G of all the neuMOS inverters is constant.

2. All circuit inputs, $V_{DD}$, and GND are inputted into all neuMOS inverters within the circuit. Furthermore, the coupling capacities with respect to the circuit input $I_i$ are constant in all neuMOS inverters.

3. In addition to all circuit inputs, $V_{DD}$, and GND, the outputs of the neuMOS inverters $v_2, \ldots, v_N$ are applied to neuMOS $v_1$ as inputs.

In the above circuit, signals are outputted from the circuit inputs through a maximum of 2 neuMOS inverters, so that this circuit will hereinafter be termed a 2-stage neuMOS circuit. The network structure of a 4-element 2-stage neuMOS circuit, in which the neuMOS inverters $v_1$, $v_2$, $v_3$, and $v_4$ are indicated by circles is shown in FIG. 9. In FIG. 9, a standard CMOS inverter is provided in order to amplify the output $v_1$.

The capacitive coupling of each neuMOS inverter is determined as given below.

$c_i C_c$: the capacitive coupling with respect to the input $I_i$ of each neuMOS inverter.

$c^k_D C_c$: the capacitive coupling with respect to the $V_{DD}$ input of $v_k$.

$c^k_S C_c$: the capacitive coupling with respect to the $V_{SS}$ of $v_k$.

$\alpha_j C_c$: the capacitive coupling with respect to the $v_j$ output of $v_1$.

At this time, the value of G of each neuMOS inverter is given by the formula below.

[Arithmetic Formula 4]

$$G = \sum_{i=1}^{n} c_i + c_D^1 + c_S^1 + \sum_{j=2}^{n} \alpha_j(v_1)$$

$$= \sum_{i=1}^{n} c_i + c_D^i + c_S^i(v_2, \ldots, v_N)$$

Here, if it is assumed that $c^2_D > \ldots > c^N_D$, then applying formula (4), the 2-stage neuMOS circuit realizes the following function.

[Arithmetic Formula 5]

$$f(x) = \begin{cases} \begin{cases} 0 & \left(\sum_{i=1}^{n} c_i x_i < \frac{G}{2} - c_D^1 - \sum_{j=2}^{N} \alpha_j\right) \\ 1 & \left(\sum_{i=1}^{n} c_i x_i > \frac{G}{2} - c_D^1 - \sum_{j=2}^{N} \alpha_j\right) \end{cases} \\ \left(\sum_{i=1}^{n} c_i x_i < \frac{G}{2} - c_D^2\right) \\ \begin{cases} 0 & \left(\sum_{i=1}^{n} c_i x_i < \frac{G}{2} - c_D^1 - \sum_{j=k}^{N} \alpha_j\right) \\ 1 & \left(\sum_{i=1}^{n} c_i x_i > \frac{G}{2} - c_D^1 - \sum_{j=k}^{N} \alpha_j\right) \end{cases} \\ \left(\frac{G}{2} - c_D^{k-1} < \sum_{i=1}^{n} c_i x_i < \frac{G}{2} - c_D^k\right) \\ (k = 3, \ldots, N) \\ \begin{cases} 0 & \left(\sum_{i=1}^{n} c_i x_i < \frac{G}{2} - c_D^1\right) \\ 1 & \left(\sum_{i=1}^{n} c_i x_i > \frac{G}{2} - c_D^1\right) \end{cases} \\ \left(\frac{G}{2} - c_D^N < \sum_{i=1}^{n} c_i x_i\right) \end{cases} \quad (5)$$

Formula (5) expresses a multiple threshold function having a plurality of threshold values, in which the output changes each time the value of the weighting addition exceeds a threshold value. If the multiple threshold function does not constrain the number of threshold values, it is possible to express freely selected logical functions, so that the 2-stage neuMOS circuit is capable of realizing freely selected logical functions. Furthermore, considering this from the other direction, if the multiple threshold function expression of a logical function is known, then the design of a 2-stage neuMOS circuit which realizes that function is a simple matter from formula (5).

However, a plurality of multiple threshold function expressions of a logical function exist, so that it is necessary to find, from among the 2-stage neuMOS circuits corresponding to the multiple threshold function expressions, that circuit which is best suited to actual implementation.

A (7,3) parallel counter circuit diagram is shown in FIG. 10 as an example of a 2-stage neuMOS circuit. The (7,3) parallel counter is a circuit which, in response to 7 inputted signals, outputs a 3-place signal expressing in binary numbers the number of input signals having a value of 1.

With respect to the layout of this circuit, the 2-stage neuMOS circuit may have a systematic layout as in the circuit diagram. As an example, the layout of the circuit diagram of the two-stage neuMOS circuit of FIG. 11(a) is shown in FIG. 11(b). From the layout diagram, when the design rules are determined, the surface area A of the 2-stage neuMOS circuit may be approximated as shown in formula (6) as a rectangular surface area in which the length in the vertical direction is a linear function of G, and the length in the horizontal direction is a linear function of the number N of neuMOS inverters.

$$A=(a_1 N+a_2)(b_1 G+b_2) \quad (6)$$

In the above formula, $a_1$, $a_2$, $b_1$, and $b_2$ are constants which are determined by the design rules.

From the above results, the present inventors proposed a method for realizing an appropriate logical function using integer programming and for designing a 2-stage neuMOS circuit having the minimum surface area. The results of designs conducted with respect to full 3-input functions using this method are shown in Tables 1–3. The results in Tables 1–3 presuppose the circuit structure shown in FIG. 9, in which a CMOS inverter is provided in order to amplify the output of the final stage neuMOS inverter of the two-stage neuMOS circuit, and the output of the CMOS inverter serves as the final circuit output.

The circuit structure of a 2-stage neuMOS circuit is fixed, so that in cases in which the value of G exceeds the upper limit of G ($G_{lim}$) which is determined by the precision of the device manufacturing process described above, the function cannot be realized.

OBJECT AND SUMMARY OF THE INVENTION

In light of the above circumstances, the present invention has as an object thereof to provide a logical operational circuit which serves to realize, using neuMOS, logical functions which were previously impossible to realize using 2-stage neuMOS circuits as a result of $G_{lim}$ constraints.

Furthermore, the present invention has as an object thereof to provide a logical operational circuit such that when the logical operational circuit is realized, the surface area when mounted is reduced in size, and which permits large scale integration.

Furthermore, the present invention has as an object thereof to provide an LSI logical operational circuit which is easy to manufacture.

The logical operational circuit of the present invention comprises 3 or more neuMOS inverters having a CMOS structure which have a floating gate and 1 or 2 or more input gates capacitively coupled with this floating gate, wherein the output of the third neuMOS inverter is connected via a capacity with the floating gate of the second neuMOS inverter, and the output of the second neuMOS inverter is connected via a capacity with the floating gate of the first neuMOS inverter, and the respective input signals are connected to at least 1 or more input gates of the neuMOS inverters in the circuit, predetermined logical operations are conducted with respect to the plurality of input signals, and the results thereof form the output of the first neuMOS inverter.

Furthermore, the logical operational circuit of the present invention comprises 3 or more neuMOS inverters having a CMOS structure which have a floating gate and 1 or 2 or more input gates capacitively coupled with the floating gate, wherein the output of the third neuMOS inverter and the output of the second neuMOS inverter are connected via a capacity with the floating gate of the first neuMOS inverter, and the various input signals are connected with at least 1 or more of the input gates of the neuMOS inverters in the circuit, predetermined logical operations are conducted with respect to the plurality of input signals, and the results thereof form the output of the first neuMOS inverter.

In the present invention, at least one of the high voltage power source and the low voltage power source is capacitively coupled with at least one of the floating gates of the first, second, and third neuMOS inverters.

BRIEF DESCRIPTION OF THE DRAWINGS

FIG. 1 is a schematic diagram which explains the logical operational circuit of the present invention.

FIG. 2 is a circuit diagram showing the logical operational circuit of the first embodiment.

FIG. 3 is a schematic pattern diagram of the logical operational circuit of the first embodiment.

FIG. 6 is a schematic pattern diagram of the logical operational circuit of the second embodiment.

DESCRIPTION OF THE PREFERRED EMBODIMENTS

The logical operational circuit of the present invention will be explained using FIG. 1. FIG. 1 shows a feed forward circuit which employs 4 neuMOS inverters. What is meant by a feed forward circuit is the most common of the circuits which do not have a feedback loop; these circuits are capable of employing, as element inputs, a freely selected number of circuit inputs and a freely selected number of element outputs from the previous stage. Hereinafter, the neuMOS circuit comprising the feed forward circuit will be termed a multi-stage neuMOS circuit. FIG. 1 shows a 4 element multi-stage neuMOS circuit. In FIG. 1, a common CMOS inverter is provided in order to amplify the output of the logical operational circuit of the present invention.

FIG. 1 shows an example of the network structure of a 4-element multi-stage neuMOS circuit employing 4 neu-MOS inverters. In the figure, a standard CMOS inverter is provided in order to amplify the output of the logical operational circuit of the present invention.

In general, the neuMOS inverters within the neuMOS circuit are numbered $v_1, \ldots, v_N$ in order from those closest to the output. The capacitive coupling of each input $(I_j; j=1, \ldots, n)$ in $v_i$ is determined as shown below.

$c^i_j C_c$: the capacitive coupling with respect to input $I_j$
$c^i_D C_c$: the capacitive coupling with respect to $V_{DD}$
$c^i_S C_c$: the capacitive coupling with respect to $V_{SS}$
$\alpha^i_K C_c$: the capacitive coupling with respect to the output of $v_K$ In the present invention, $c^i_j$, $c^i_D$, $c^i_S$, $\alpha^i_K$, (i=1, . . . N; j=1, . . . n: k=2, . . . N: and moreover, k>i) may have a value of 0 or that of a positive integer; however, the conditions are such that with respect to each value of j, at least 1 of the values of $c^i_j$ (where i=1, . . . , N) the value of $\alpha^1_2$, and at least one of the values of $\alpha^i_k$ (where i=1, . . . , N; k=2, . . . , N) with the exception of $\alpha^1_2$ have a value other than 0.

At this time the total number of input gates $G^i$ of $v_i$ is expressed by the following formula.

[Arithmetic Formula 6]

$$G^i = \sum_{r=1}^{n} c^i_r + c^i_D + c^i_S + \sum_{s=i+1}^{N} \alpha^i_s \quad (7)$$

Figure 12B:
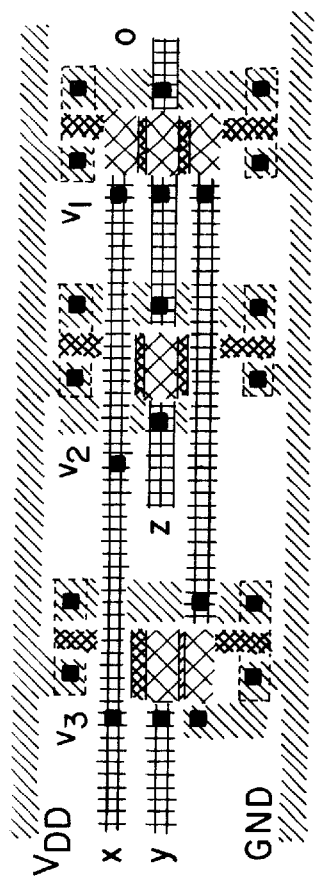
FIG. 12 serves to explain the surface of the multi-stage neuMOS circuit.
Figure 12A:
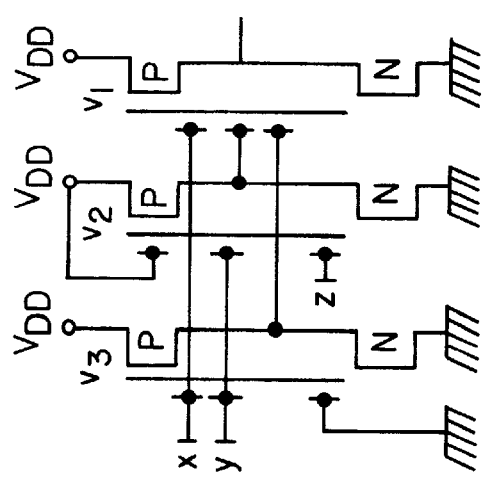

An example of a multi-stage neuMOS circuit is shown in FIG. 12(a), while the layout thereof is shown in FIG. 12(b). The multi-stage neuMOS circuit differs from the two-stage neuMOS circuit; herein, $G^1 = \ldots = G^N$ is not always true, and from the layout diagram, the mounted surface area of the multi-stage neuMOS circuit may be approximated as a rectangular surface area in the following manner.

$$A = (a_1 N + a_2)(b_1 G_{max} + b_2) \quad (8)$$

$$G_{max} = \max_{i=1, \cdots, N} G^i$$

In Formula (8), $a_1$, $a_2$, $b_1$, and $b_2$ are constants determined by the design rules.

(Application of Integer Programming)

The design target is set at obtaining a multi-stage neuMOS circuit which realizes a logical function and which has the minimum surface area given that $G_{lim} \geq G_{max}$. The design of a multi-stage neuMOS circuit which realizes a logical function f(x) is conducted by means of the following procedure.

Step 1: N=i is set.

Step 2: The circuit having the smallest value of $G_{max}$ under the conditions that $G_{lim} \geq G_{max}$ is determined. If a solution is present, this is substituted into Formula (8) and the surface area is calculated.

Step 3: If in Step 2, $G_{max}$=3, then control proceeds to step 4, while when Gmax is not equal to 3, N is set equal to N+1, and control returns to Step 2.

Step 4: The multi-stage neuMOS circuit having the smallest surface area is selected from among the multi-stage neuMOS circuits which were determined.

G equals 1 in all neuMOS inverters in a multi-stage neuMOS circuit in which $G_{max}$<3, and these only realize a simple inverter function. For this reason, multi-stage neuMOS circuits in which $G_{max}$<3 may be excluded from consideration. Furthermore, neuMOS inverters in which G is equal to 3 realize a 2-input NAND element, and freely selected logical functions may be expressed by means of the 2-input NAND elements, so that the procedure above terminates within a limited number of cycles.

In order to determine the circuit in which $G_{max}$ has a minimum value in step 2, it is sufficient to determine the circuit in which $G^1$ has a minimum value under the conditions that $G^1= \ldots =G^N$. The reason for this is as follows.

First, it was previously shown that neuMOS inverters in which the capacitive coupling of each input gate was given by $c_i C_c$ (i=1, ..., n) realize the threshold function shown in Formula (4). Two input gates are added to these neuMOS inverters; $V_{DD}$ is connected to one input gate, while VSS is connected to the other input gate. The capacitive coupling is set so that $c_i+1C_c=c_i+2C_c=tC_c$ (where t is a positive integer). This neuMOS inverter realizes the threshold function given below.

(Arithmetic Formula 7)

$$f(x) = \begin{cases} 1 & \left( \sum_{i=1}^{n} c_i x_i + t < \sum_{i=1}^{n} \frac{G+2t}{2} \right) \\ 0 & \left( \sum_{i=1}^{n} c_i x_i + t > \sum_{i=1}^{n} \frac{G+2t}{2} \right) \end{cases}$$

This formula may be rearranged to form Formula (4). From this, multi-stage neuMOS circuits containing neuMOS inverters $v_i$ in which $G_{max}>G^i$ (where i=1, ..., N) may also be converted to multi-stage neuMOS circuits in which $G_{max}=G^i$, if input gates connected to $V_{DD}$ and $V_{SS}$ are connected to $v_i$ and the coupling capacity thereof is set to $(G_{max}-G^i)/2$. By means of this, it is possible to determine the smallest value of Gmax even if the conditions provided are such that $G^1= \ldots =G^N$.

The problem to be solved in Step 2 can be returned to the integer programming problem when applying the design method of the two-stage neuMOS circuit. This is shown below.

Target Function: The target function of this problem is expressed by the following formula.

(Arithmetic Formula 8)

$$G^i = \sum_{r=1}^{n} c_r^i + c_D^i + c_S^i + \sum_{s=i+1}^{N} \alpha_s^i$$

Limiting Conditions: Among the limiting conditions of this problem, the limiting conditions relating to the circuit as a whole are given by the following formulas.

$$G_{lim} \geq G^1 \tag{9}$$

$$G^1 = \ldots = G^N \tag{10}$$

The output of $v_i$ (where i=1, ..., N), when a given input vector $x_{(t)}=(x_{1(t)}, \ldots, x_{n(t)})$ is inputted, is represented by $y^i_{(t)}$. The limiting conditions relating to the input vector x(t) are given by the following formulas.

(Arithmetic Formula 9)

$$y_{(t)}^j = \begin{cases} 1 & \left( \sum_{r=1}^{n} c_r^j x_{r(t)} + c_D^j + \sum_{s=j+1}^{n} \alpha_s^j y_{(t)}^s < \frac{G^j}{2} \right) \\ 0 & \left( \sum_{r=1}^{n} c_r^j x_{r(t)} + c_D^j + \sum_{s=j+1}^{n} \alpha_s^j y_{(t)}^s > \frac{G^j}{2} \right) \end{cases} \tag{11}$$

$(j = 1, \ldots, N)$ $$y_{(t)}^1 = f(x_{(t)}) \tag{12}$$

Formulas (11) and (12) are only necessary for values which $x_{(t)}$ may attain.

Finally, in order that the neuMOS inverters within the circuit not be fixed at 0 or 1, the following limiting conditions are necessary.

(Arithmetic Formula 10)

$$c_D^k < \frac{G^k}{2} \tag{13}$$

$$c_S^k < \frac{G^k}{2} \quad (k = 1, \ldots, N) \tag{14}$$

In order to return to the integer programming problem, it is necessary to express the threshold function of formula (11) and the second order term $a_s^j y_{(t)}^s$ in Formula (11) as a linear inequality. Since $y \in \{1, 0\}$, the threshold function may be expressed in the following manner if a sufficiently large constant U is employed.

(Arithmetic Formula 11)

$$X > -UY \quad X < U(1-Y) \tag{15}$$

Since $y_{(t)}^s \in \{1, 0\}$, the second order term $^j_s y_{(t)}^s$ may be expressed in the following manner where $\beta^j_{s(t)} = a^j_s y^s_{(t)}$.

(Arithmetic Formula 12)

$$\beta_{s(t)}^j \leq U y_{(t)}^s$$

$$\beta_{s(t)}^j \geq 0 \tag{16}$$

$$\beta_{s(t)}^j \leq \alpha_s^j + U(1-y_{(t)}^s)$$

$$\alpha_s^j \leq \beta_{s(t)}^j + U(1-y_{(t)}^s)$$

By means of the above calculations, all the limiting conditions may be converted into linear inequalities.

Next in order to investigate the G reduction effect of the present method, design of multi-stage neuMOS circuits where N=2, 3 was conducted with respect to all three input logical functions. The results thereof are shown in Tables 1–3. The results shown in Tables 1–3 presuppose a circuit design in which, as shown in FIG. 1, a CMOS inverter is provided in order to amplify the output of the final stage neuMOS inverter of the multi-stage neuMOS circuit, and the output of the CMOS inverter forms the final circuit output. Furthermore, no limitations are provided with respect to $G_{lim}$.

In the tables, the effects of the realization of the logical function using a 2-stage neuMOS circuit and a multi-stage neuMOS circuit are compared. With respect to the multi-stage circuit, realization was possible when N=2, and in the case in which the G of the circuit where N=3 was smaller that the G of the circuit where N=2, both values are shown.

From the tables, it can be seen that in 2-stage neuMOS circuits in which G was small, there was almost no reduction effect even when installation was conducted using multi-stage neuMOS circuitry; however, with respect to functions which required a G value of 10 or more when realization of the function was conducted using 2-stage neuMOS circuitry, a G value of 10 or less was realized in all cases when multi-stage neuMOS circuitry was employed. That is to say, it was learned that the larger the G value of a function using 2-stage neuMOS circuitry, the greater the G reduction effect when the function was realized using multi-stage neuMOS circuitry.

TABLE 1

| Function | | | 2-stage neuNOS circuit | | Multi-stage neuMOS circuit | |
|---|---|---|---|---|---|---|
| NPN equivalent | NP equivalent | P equivalent | G | N | G | N |
| xy + xz + yz | xy + xz + yz | xy + xz + yz | 3 | 1 | 3 | 1 |
| | | $\overline{xy}$ + $\overline{xz}$ + yz | 7 | 2 | 3 | 2 |
| | | $\overline{xy}$ + $\overline{xz}$ + yz | 7 | 2 | 3 | 2 |
| | | $\overline{xy}$ + $\overline{xz}$ + $\overline{yz}$ | 11 | 3 | 3 | 3 |
| x + y + z | x + y + z | x + y + z | 5 | 1 | 5 | 1 |
| | | | | | 3 | 3 |
| | | $\overline{x}$ + $\overline{y}$ + $\overline{z}$ | 7 | 2 | 5 | 2 |
| | | | | | 3 | 3 |
| | | $\overline{x}$ + $\overline{y}$ + $\overline{z}$ | 11 | 2 | 3 | 2 |
| | | $\overline{x}$ + y + z | 11 | 2 | 5 | 2 |
| | | | | | 3 | 3 |
| | xyz | xyz | 5 | 1 | 5 | 1 |
| | | | | | 3 | 3 |
| | | $\overline{xyz}$ | 7 | 2 | 5 | 2 |
| | | | | | 3 | 3 |
| | | $\overline{x}\overline{y}\overline{z}$ | 11 | 2 | 3 | 2 |
| | | $\overline{x}yz$ | 11 | 2 | 5 | 2 |
| | | | | | 3 | 3 |

TABLE 2

| Function | | | 2-stage neuNOS circuit | | Multi-stage neuMOS circuit | |
|---|---|---|---|---|---|---|
| NPN equivalent | NP equivalent | P equivalent | G | N | G | N |
| xy + xz | xy + xz | xy + xz | 5 | 1 | 5 | 1 |
| | | | | | 3 | 3 |
| | | $\overline{xy}$ + $\overline{xz}$ | 9 | 2 | 5 | 2 |
| | | | | | 3 | 3 |
| | | xz + $\overline{yz}$ | 9 | 2 | 3 | 2 |
| | | x$\overline{y}$ + $\overline{xz}$ | 11 | 2 | 3 | 2 |
| | | $\overline{x}y$ + $\overline{xz}$ | 11 | 2 | 5 | 2 |
| | | | | | 3 | 3 |
| | | $\overline{xy}$ + $\overline{xz}$ | 13 | 3 | 3 | 3 |
| | x + yz | x + yz | 5 | 1 | 5 | 1 |
| | | | | | 3 | 3 |
| | | $\overline{x}$ + $\overline{yz}$ | 9 | 2 | 5 | 2 |
| | | | | | 3 | 3 |
| | | x + y$\overline{z}$ | 9 | 2 | 3 | 2 |
| | | $\overline{xz}$ + y | 11 | 2 | 3 | 2 |
| | | $\overline{x}$+ yz | 11 | 2 | 5 | 2 |
| | | | | | 3 | 3 |
| | | $\overline{xz}$ + $\overline{y}$ | 13 | 3 | 3 | 3 |
| x ⊕ y ⊕ z | x ⊕ y ⊕ z | x ⊕ y ⊕ z | 5 | 2 | 5 | 2 |
| | | $\overline{x}$ ⊕ y ⊕ z | 7 | 3 | 5 | 3 |
| xyz + $\overline{xyz}$ | xyz + $\overline{xyz}$ | xyz + $\overline{xyz}$ | 7 | 2 | 7 | 2 |
| | | $\overline{xyz}$ + $\overline{xyz}$ | 9 | 2 | 9 | 2 |
| | | | | | 5 | 3 |
| | x$\overline{z}$ + $\overline{x}z$ + y$\overline{z}$ + $\overline{y}z$ | x$\overline{z}$ + $\overline{x}z$ + y$\overline{z}$ + $\overline{y}z$ | 7 | 2 | 7 | 2 |
| | | xz + $\overline{xz}$ + yz + $\overline{yz}$ | 9 | 2 | 9 | 2 |
| | | | | | 5 | 3 |
| $\overline{xyz}$ + $\overline{x}y\overline{z}$ + $\overline{xyz}$ | $\overline{xyz}$ + $\overline{x}y\overline{z}$ + $\overline{xyz}$ | $\overline{xyz}$ + $\overline{x}y\overline{z}$ + $\overline{xyz}$ | 7 | 2 | 7 | 2 |
| | | xy$\overline{z}$ + $\overline{x}y\overline{z}$ + $\overline{xyz}$ | 7 | 2 | 7 | 2 |
| | | | | | 5 | 3 |
| | | xyz + $\overline{xyz}$ + $\overline{xyz}$ | 7 | 2 | 5 | 2 |
| | | xy$\overline{z}$ + $\overline{xyz}$ + $\overline{xyz}$ | 9 | 3 | 5 | 3 |

TABLE 2-continued

| Function | | | 2-stage neuNOS circuit | | Multi-stage neuMOS circuit | |
|---|---|---|---|---|---|---|
| NPN equivalent | NP equivalent | P equivalent | G | N | G | N |
|  | $xyz + \overline{xy} + \overline{xz} + \overline{yz}$ | $xyz + \overline{xy} + \overline{xz} + \overline{yz}$ | 7 | 2 | 7 | 2 |
|  |  | $xy + xz + \overline{xyz} + yz$ | 7 | 2 | 7 | 2 |
|  |  |  |  |  | 5 | 3 |
|  |  | $x\overline{y} + xz + \overline{xyz} + \overline{yz}$ | 7 | 2 | 5 | 2 |
|  |  | $xyz + \overline{xy} + \overline{xz} + y\overline{z}$ | 9 | 3 | 5 | 3 |

TABLE 3

| Function | | | 2-stage neuNOS circuit | | Multi-stage neuMOS circuit | |
|---|---|---|---|---|---|---|
| NPN equivalent | NP equivalent | P equivalent | G | N | G | N |
| $xz + \overline{xyz}$ | $xy + \overline{xyz}$ | $xy + \overline{x}yz$ | 7 | 2 | 7 | 2 |
|  |  |  |  |  | 5 | 3 |
|  |  | $xyz + \overline{yz}$ | 11 | 2 | 7 | 2 |
|  |  |  |  |  | 5 | 3 |
|  |  | $\overline{xyz} + yz$ | 11 | 2 | 5 | 2 |
|  |  | $\overline{xyz} + y\overline{z}$ | 13 | 2 | 5 | 2 |
|  |  | $x\overline{z} + \overline{x}yz$ | 13 | 2 | 9 | 2 |
|  |  |  |  |  | 5 | 3 |
|  |  | $\overline{x}yz + \overline{yz}$ | 9 | 3 | 5 | 3 |
|  | $x\overline{z} + \overline{x}z + yz$ | $x\overline{z} + \overline{x}z + yz$ | 7 | 2 | 7 | 2 |
|  |  |  |  |  | 5 | 3 |
|  |  | $x\overline{z} + y\overline{z} + \overline{y}\overline{z}$ | 11 | 2 | 7 | 2 |
|  |  |  |  |  | 5 | 3 |
|  |  | $\overline{x}z + y\overline{z} + \overline{y}\overline{z}$ | 11 | 2 | 5 | 2 |
|  |  | $\overline{x}z + y\overline{z} + \overline{y}\overline{z}$ | 13 | 2 | 5 | 2 |
|  |  | $xy + \overline{xy} + yz$ | 13 | 2 | 9 | 2 |
|  |  |  |  |  | 5 | 3 |
|  |  | $x\overline{z} + \overline{x}z + \overline{yz}$ | 9 | 3 | 5 | 3 |
| $xyz + \overline{xy} + \overline{xz}$ | $xyz + \overline{xy} + \overline{xz}$ | $xyz + \overline{xy} + \overline{xz}$ | 9 | 2 | 7 | 2 |
|  |  |  |  |  | 5 | 3 |
|  |  | $xy + xz + \overline{xyz}$ | 9 | 2 | 9 | 2 |
|  |  |  |  |  | 5 | 3 |
|  |  | $x\overline{y} + \overline{xyz} + \overline{y}z$ | 9 | 2 | 7 | 2 |
|  |  |  |  |  | 5 | 3 |
|  |  | $x\overline{y} + x\overline{z} + \overline{x}yz$ | 9 | 2 | 9 | 2 |
|  |  |  |  |  | 5 | 3 |
|  |  | $xz + \overline{xyz} + \overline{y}z$ | 11 | 2 | 9 | 2 |
|  |  |  |  |  | 5 | 3 |
|  |  | $x\overline{z} + \overline{x}yz + \overline{yz}$ | 13 | 3 | 5 | 3 |
| $xyz + \overline{xyz}$ | $xyz + x\overline{yz}$ | $xyz + x\overline{yz}$ | 9 | 2 | 5 | 2 |
|  |  | $xy\overline{z} + x\overline{y}z$ | 9 | 2 | 7 | 2 |
|  |  |  |  |  | 5 | 3 |
|  | $x + y\overline{z} + \overline{y}z$ | $x\overline{yz} + \overline{xyz}$ | 9 | 2 | 5 | 2 |
|  |  | $xy\overline{z} + \overline{xyz}$ | 11 | 3 | 5 | 3 |
|  | $\overline{xy} + yz$ | $x + yz + \overline{yz}$ | 9 | 2 | 5 | 2 |
|  |  | $\overline{x} + yz + \overline{yz}$ | 9 | 2 | 7 | 2 |
|  |  |  |  |  | 5 | 3 |
|  |  | $x + yz + \overline{yz}$ | 9 | 2 | 7 | 2 |
|  |  |  |  |  | 5 | 3 |
|  |  | $\overline{x} + y\overline{z} + \overline{y}\overline{z}$ | 11 | 3 | 5 | 3 |
| $x\overline{y} + yz$ |  | $x\overline{y} + yz$ | 9 | 2 | 7 | 2 |
|  |  |  |  |  | 5 | 3 |
|  |  | $\overline{xz} + yz$ | 13 | 3 | 5 | 2 |
|  |  | $\overline{xy} + \overline{y}z$ | 13 | 3 | 5 | 2 |
|  |  | $x\overline{y} + \overline{x}z$ | 13 | 3 | 3 | 3 |

Hereinbelow, the logical operational circuit of the present invention will be explained using embodiments; however, it is of course the case that the present invention is in no way restricted to the embodiments described.

Embodiment 1

As an example of a logical operational circuit, a circuit which realizes the logical function

[Arithmetic Formula 13]

$$\overline{x\overline{z} + \overline{x}yz + \overline{y}\overline{z}}$$

was considered, using a 2-stage neuMOS circuit structure and a multi-stage neuMOS structure. The circuit diagrams are shown in FIG. 2 and the pattern diagrams are shown in FIG. 3.

In the figures, the coupling capacities of each input gate were, in the case of the 2-stage neuMOS circuit structure, $c_1=1$, $c_2=3$, $c_3=2$, $\alpha_2=4$, $\alpha_3=3$, $c^2_D=6$, $c^2_S=1$, $c^3_D=2$, $c^3_S=5$.

On the other hand, in the multi-stage neuMOS circuit structure, the capacities were such that $c^1_1=1$, $c^1_2=1$, $\alpha^1_2=2$, $\alpha^1_3=1$, $c^2 1=1$, $c^2_2=2$, $c^2_S=1$, $\alpha^2_3=1$, $c^3_1=1$, $c^3_2=1$, $c^3_3=2$, $c^3_D=1$; the others had a value of 0.

Figure 4:
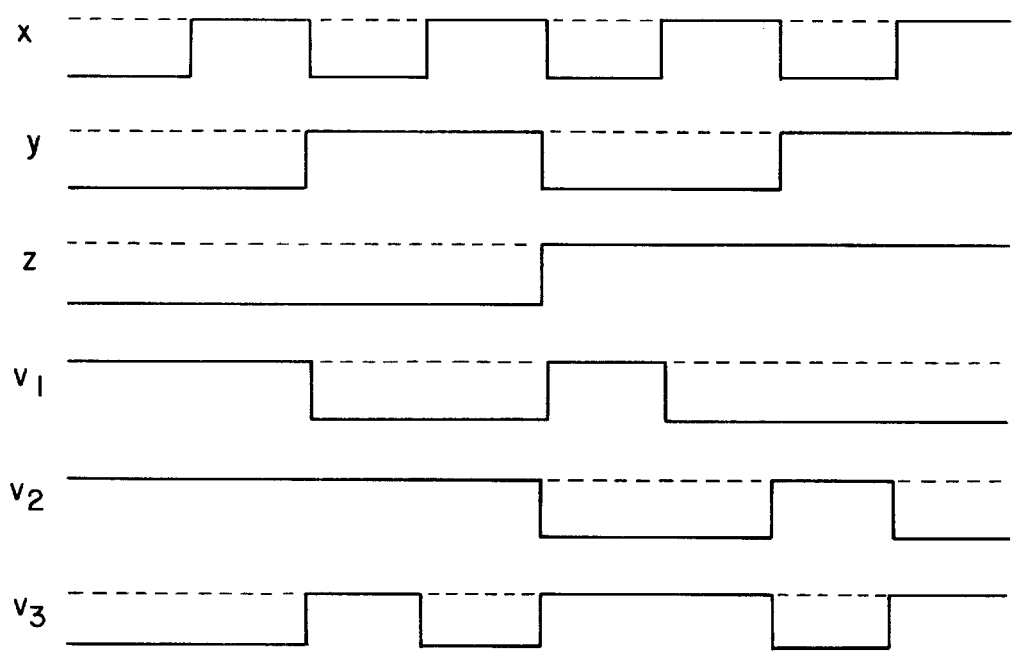
FIG. 4 is a graph showing the operational characteristics of the logical operational circuit of the first embodiment.

With respect to the multi-stage neuMOS circuit of the present embodiment, the output of each neuMOS inverter with respect to input signals x, y, and z is as shown in FIG. 4. As is clear from the figure, the circuit of the present embodiment was capable of accurately expressing the logical function above. Furthermore, as shown in FIG. 3, in comparison with the case in which 2-stage neuMOS circuitry was employed, the circuit of the present invention occupied only half the surface area. Furthermore, by means of using the structure of the present embodiment, G involved 5 levels, which is smaller than the 13 levels seen in the case of the 2-stage neuMOS circuitry, and since a high level of manufacturing precision is not required in the manufacturing process, the manufacturing processes are simplified and it is possible to produce such large scale integrated logical circuits with a high yield.

Embodiment 2

In the present embodiment, a circuit which realizes the logical function

Figure 5A:
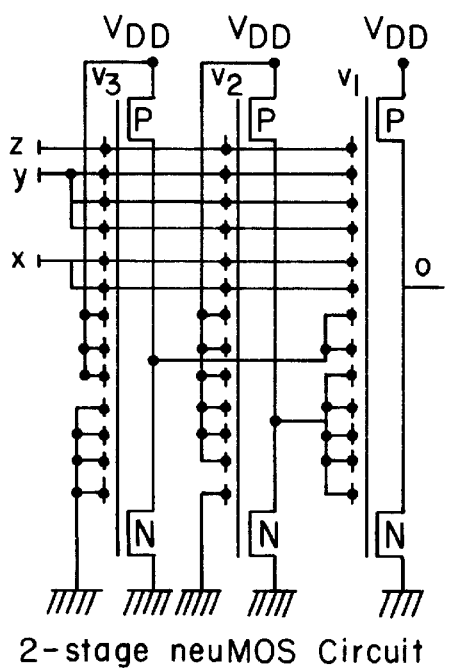
FIG. 5 is a circuit diagram showing the logical operational circuit of the second embodiment.
Figure 5B:
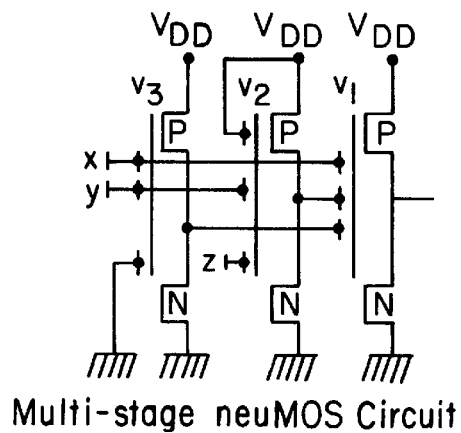

[Arithmetic Formula 14]

$$\overline{x\overline{y} + \overline{x}z}$$

was considered using a 2-stage neuMOS circuit structure and a multi-stage neuMOS circuit structure, as in embodiment 1. The respective circuit diagrams and pattern diagrams are shown in FIGS. 5 and 6.

The coupling capacities between each input gate and the floating gate were, in the case of the 2-stage neuMOS structure, $c_1=1$, $c_2=3$, $c_3=1$, $\alpha_2=5$, $\alpha_3=2$, $c^2_D=6$, $c^2_S=1$, $c^3_D=3$, and $c^3_S=4$, while in the case of the multi-stage neuMOS structure of the present embodiment, the capacities were $c^1_1=1$, $\alpha^1_2=2$, $\alpha^1_3=1$, $c^2_D=1$, $c^2_2=1$, $c^2_3=1$, $c^3_1=1$, $c^3_2=1$ and $c^3_S=1$, while the other capacities had a value of 0.

Figure 7:
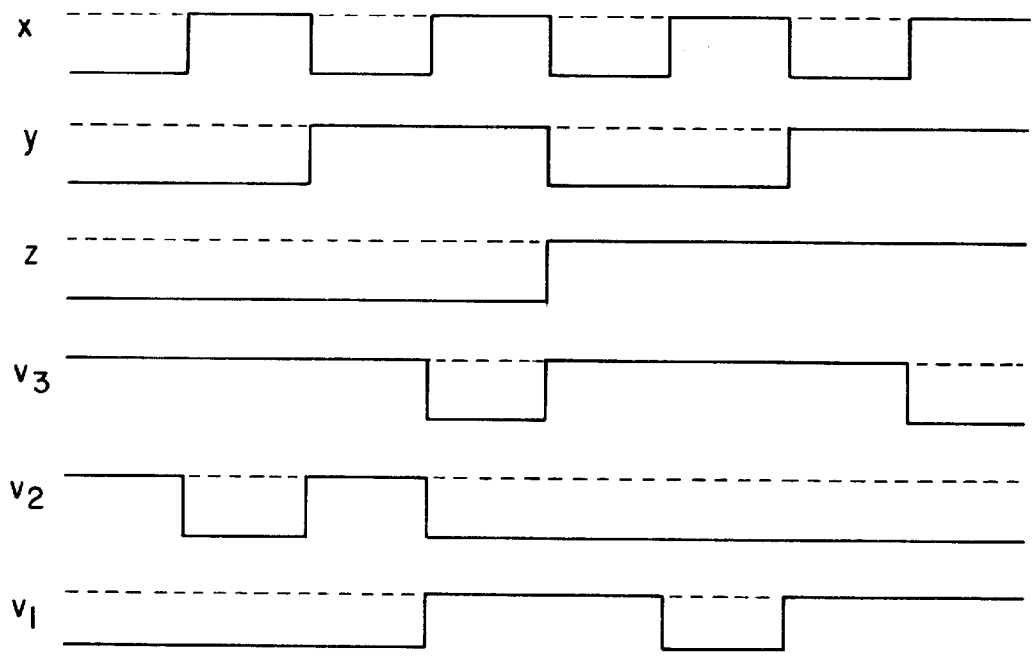
FIG. 7 shows the operational characteristics of the logical operational circuit of the second embodiment.
Figure 8A:
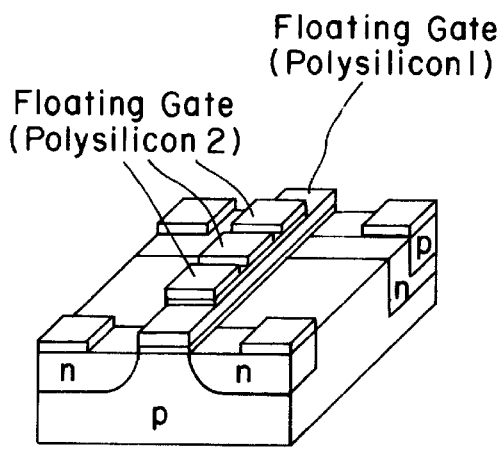
FIG. 8 is a schematic diagram showing the basic structure of the neuMOS inverter.
Figure 8B:
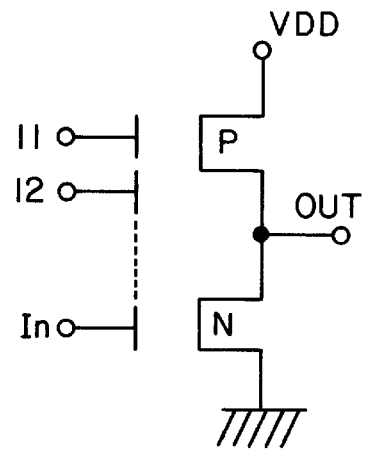
Figure 9:
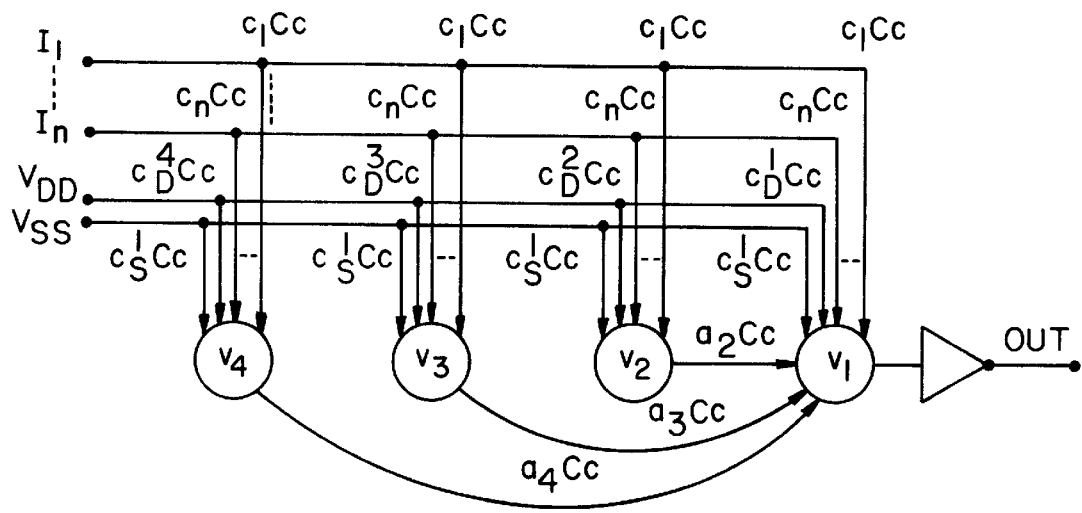
FIG. 9 is a schematic diagram explaining the 2-stage neuMOS circuit.
Figure 10:
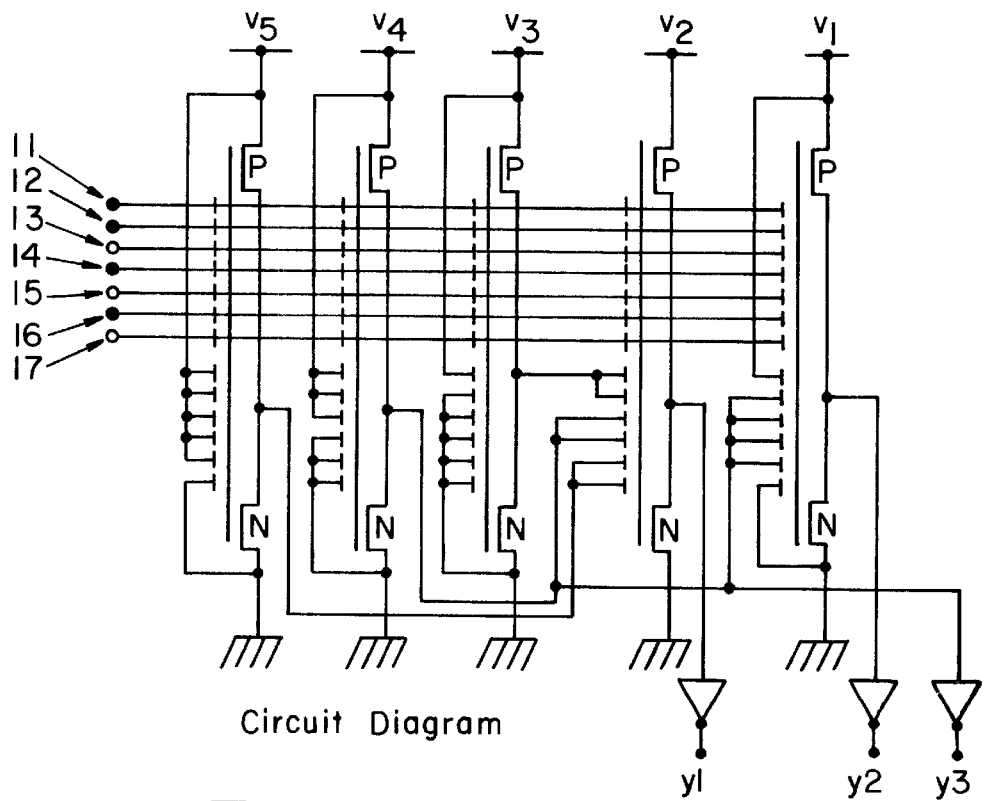
FIG. 10 is a circuit diagram showing a parallel counter constructed using 2-stage neuMOS circuitry.
Figure 11B:
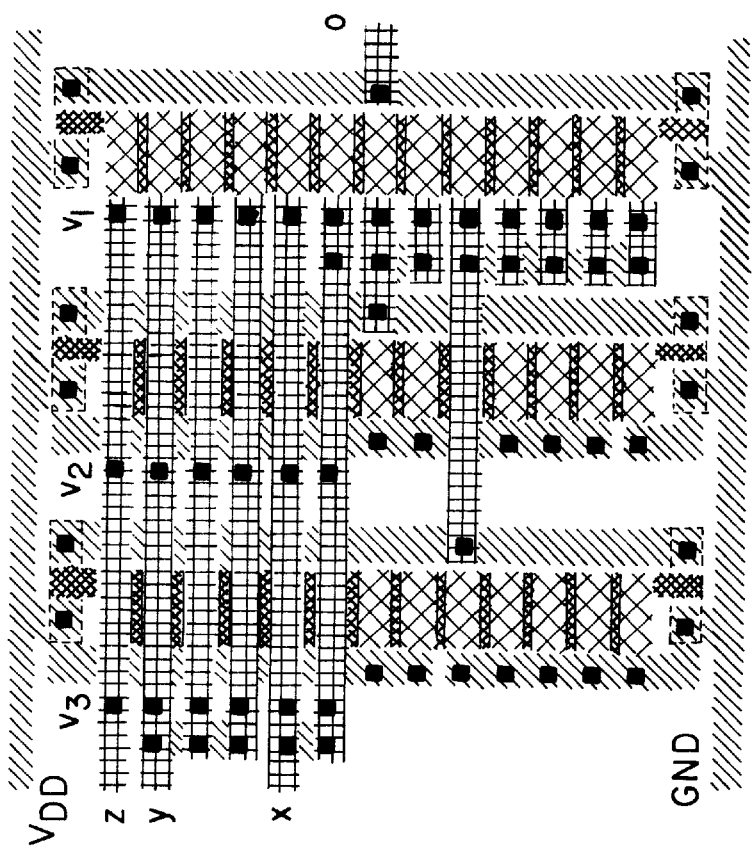
FIG. 11 serves to explain the surface of the two-stage neuMOS circuit.
Figure 11A:
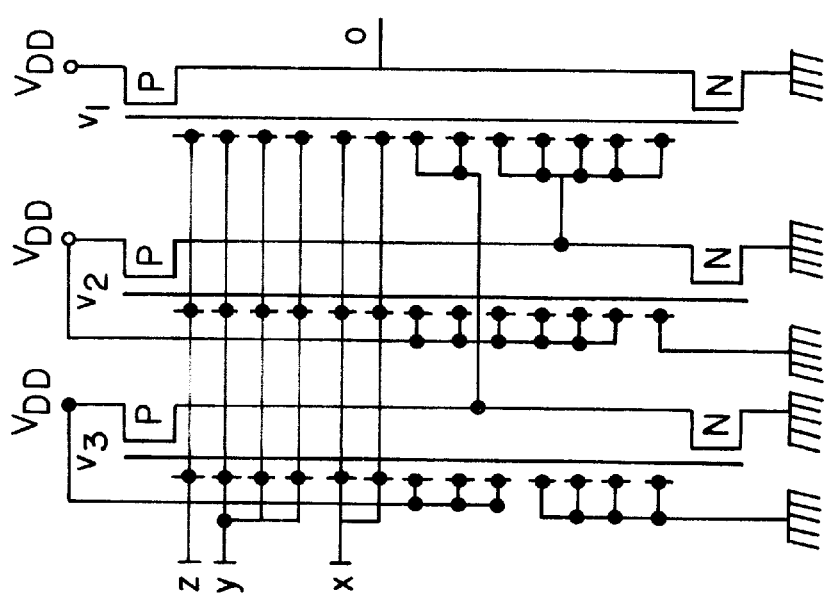

The operational characteristics of the circuit of this embodiment are shown in FIG. 7. As is clear from FIG. 7, the circuit expresses the logical function described above.

While G involved 13 levels in the case of the 2-stage neuMOS, only 3 levels were needed in the present embodiment. Furthermore, with respect to the surface area of the circuitry, as well, it was possible to limit this circuit area to ⅓ that in the case of the 2-stage neuMOS circuit structure.

By means of the present invention, the voltage levels which must be discriminated on the floating gate become smaller, so that a high degree of manufacturing precision is not required when producing the neuMOS, and moreover, the mounted surface area is also reduced in size.

Accordingly, by means of the present invention, it becomes possible to produce a variety of logical operational circuits with a high yield, and furthermore, a further increase in large scale integration is possible.

What is claimed is:

1. A logical operational circuit, comprising three or more neuMOS inverters having a CMOS structure having a floating gate and one or two or more input gates capacitively coupled with said floating gate;

wherein the output of a third neuMOS inverter is connected via a capacity with the floating gate of a second neuMOS inverter, and the output of said second neuMOS inverter is connected via a capacity with the floating gate of a first neuMOS inverter;

said logical operational circuit having the smallest installation area as chosen from a plurality of installation areas approximated by areas of rectangles on the basis of the layouts of said neuron MOS inverters; and a plurality of input signals are connected to at least one or more of the input gates of said neuMOS inverters within the circuit, predetermined logical operations are conducted with respect to said plurality of input signals in which each neuMOS gives an unequal predetermined weight to at least one input signal and compares an added value of the input signals to a threshold value, and the results thereof are made the output of said first neuMOS inverter.

2. A logical operational circuit in accordance with claim 1 wherein one or the other of a high voltage power source and a low voltage power source is capacitively coupled with at least one of the floating gates of said first, second, and third neuMOS inverters.

3. A logical operational circuit comprising 3 or more neuMOS inverters having a CMOS structure having a floating gate and one or two or more input gates capacitively coupled with said floating gate, wherein the output of a third neuMOS inverter and the output of a second neuMOS inverter are connected via a capacity wit the floating gate of a first neuMOS inverter, and a plurality of input signals are connected to at least one or more of the input gates of the neuMOS inverters within te circuit, predetermined logical operations are conducted with respect to said plurality of input signals in which each neuMOS gives an unequal predetermined weight to at least one input signal and compares an added value of the input signals to a threshold value, and the results thereof are made the output of said first neuMOS inverter.

4. A logical operational circuit, comprising plural input terminals and 3 or more neuron MOS inverters wherein said each neuron MOS inverter comprises a floating gate in a potential floating state and plural input gates capacity couple with said floating gate, and said each neuron MOS inverter conducts weight to an input signal which is applied to said input gate and compares an added value of the input signal which is conducted weight with a threshold value, and changes an output signal complying with a comparison result, said each input terminal is connected to at least one or more input gates respectively, the neuron MOS inverters form first stage to last stage are predetermined in said 3 or more neuron MOS inverters, said last stage neuron MOS inverter outputs an output signal to said output terminal as a result of logical operation of the input signal applied to the said plural input terminals.

5. A logical operational circuit in accordance with claim 4 wherein said each input terminal is connected to all of said input gates of said neuron MOS inverters, and the output terminal of each stage is connected to all of said input gages of the neuron MOS inverters between said first stage to just before said last stage.

6. A logical operational circuit in accordance with claim 5 wherein one or the other of a high voltage power source and a low voltage which runs said each neuron MOS inverter is connected to said input gate of the neuron MOS inverter.

7. A logical operational circuit in accordance with claim 4 wherein one or the other of a high voltage power source and a low voltage which runs said each neuron MOS inverter is connected to said input gate of the neuron MOS inverter.

8. A logical operational circuit comprising:
a plurality of input terminals, an output terminal, and three or more neuron MOS inverters, wherein:
each of said neuron MOS inverters comprise:
a floating gate in a floating state in terms of electric potential;
a plurality of input gates connected via a capacity with said floating gate;
each of said neuron MOS inverters uses said capacity connected with each of said input gates to assign an unequal weight to at least one of the input signals applied to each of said input gates;
each of said neuron MOS inverters compares the magnitude of additional values of weighted input signals with the magnitude of the threshold value;
each of said neuron MOS inverters changes output signals depending on the results of the comparison;
each of said input terminals are connected with an input gate of at least one of said neuron MOS inverters;
a neuron MOS inverter in first stage through a neuron MOS inverter in the last stage are predesignated among said three or more neuron MOS inverters;
in said first stage through any stage lower than said last stage, the output terminal in each stage is connected with the input gate of at least one of the neuron MOS inverters in higher stages;
the results of predetermined logical operations conducted on input signals applied to said plurality of input terminals are transmitted as output signals to said output terminals by the neuron MOS inverter in said last stage; and
said logical operational circuit having the smallest installation area as chosen from said plurality of installation areas approximated by areas of rectangles on the basis of all of the layouts of said neuron MOS inverters.

9. A logical operational circuit in accordance with claim 8 wherein each of said input terminals is connected with the input gates of all of said neuron MOS inverters; and
in said first stage through any stage lower than said last stage, the output terminal in each stage is connected with the input gates of all of the neuron MOS inverters.

10. A logical operational circuit in accordance with claim 9 wherein as regards a high voltage power supply and a low voltage power supply both for driving each of said neuron MOS inverters, at least one of said power supplies is connected with the input gates of said neuron MOS inverters.

11. A logical operational circuit in accordance with claim 8 wherein as regards a high voltage power supply and a low voltage power supply both for driving each of said neuron MOS inverters, at least one of said power supplies is connected with the input gates of said neuron MOS inverters.

* * * * *